United States Patent Office 3,426,826
Patented Feb. 11, 1969

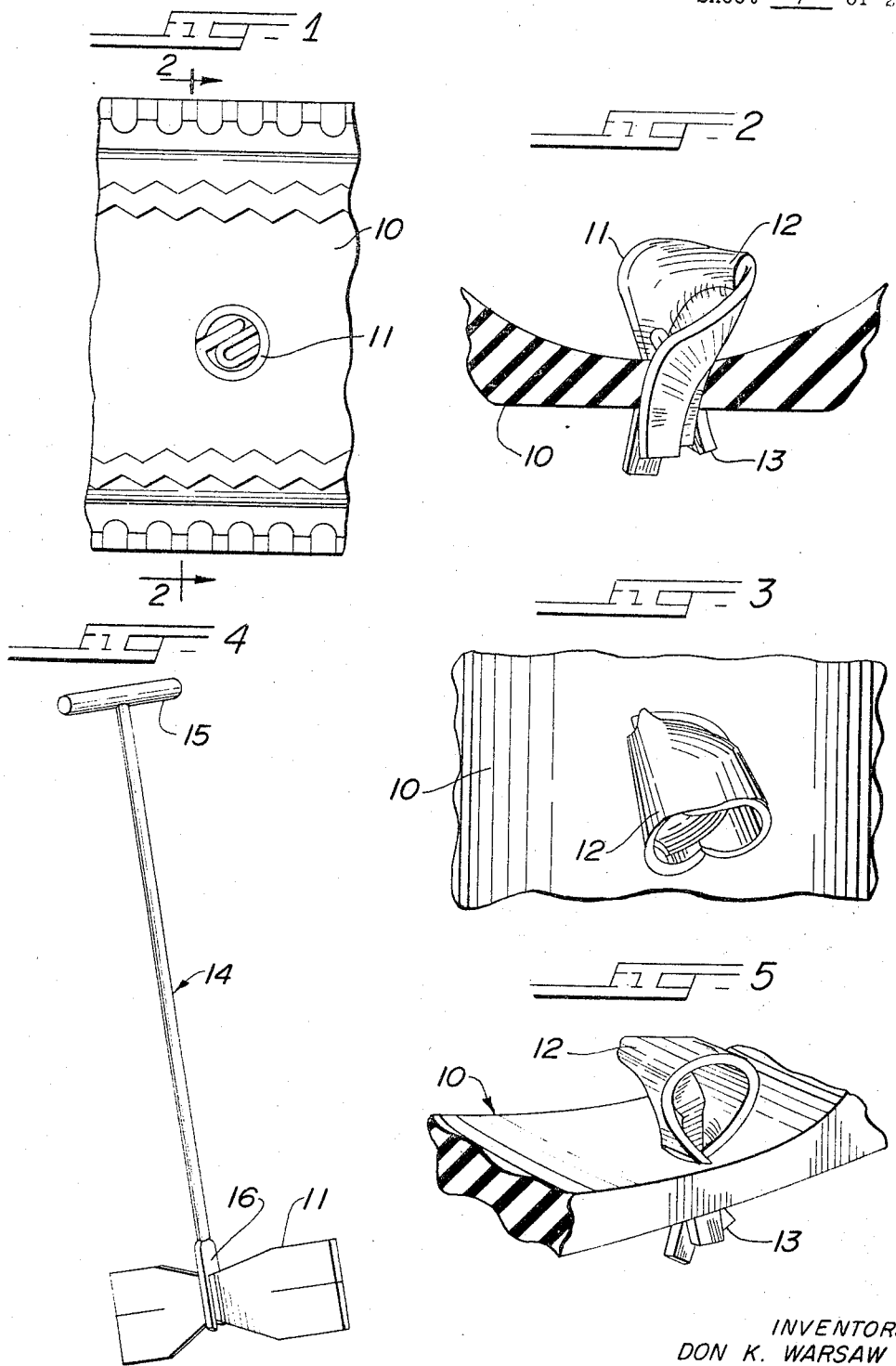

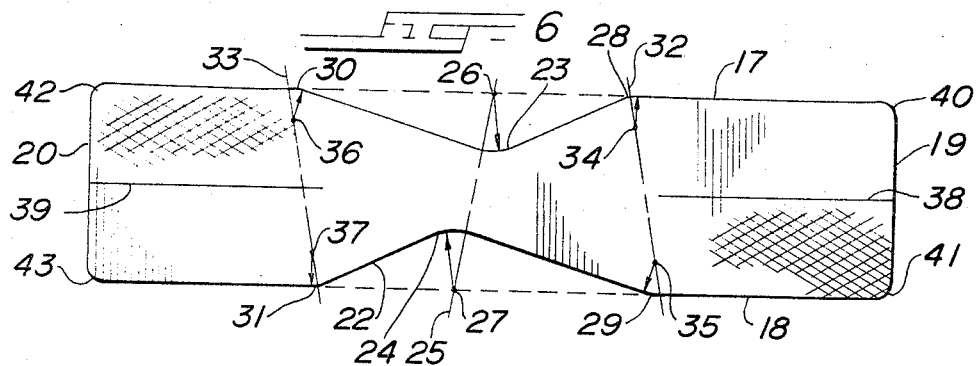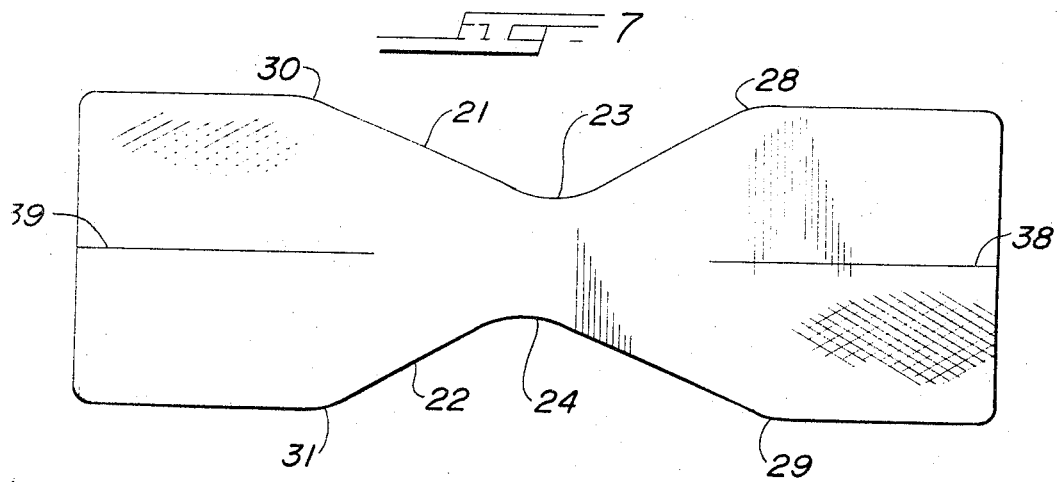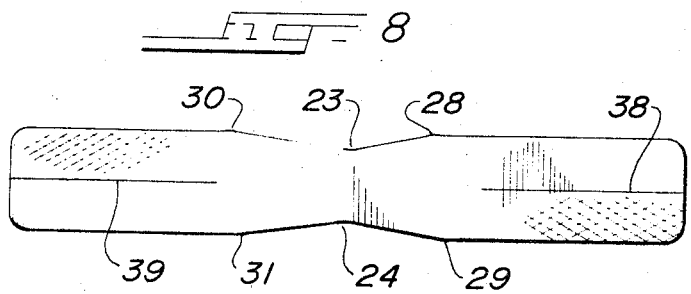

3,426,826
TIRE-REPAIR PLUG
Don K. Warsaw, 2031 Wilshire Drive SE. 49506, and Carl E. Brandt, 2142 Madison Ave. SE. 49507, both of Grand Rapids, Mich.
Filed Dec. 12, 1966, Ser. No. 601,121
U.S. Cl. 152—370
Int. Cl. B60c 21/06
3 Claims

ABSTRACT OF THE DISCLOSURE

A tire-repair plug made of a substantially flat sheet of material bondable to a tire, and having a peripheral configuration inducing a pattern of folding that results in improved filling of a hole in the tire in which the plug is inserted.

---

This invention relates to the construction of insert plugs for repairing vehicle tires. These plugs are particularly adapted for use with tubeless tires, and have the definite advantage of being insertable from the outside without the necessity of removing the tire from the rim. These plugs are not broadly new, and a variety of configurations have been devised to permit the manufacture of the plugs from relatively standard materials, while providing an adequate closure of the hole in the tire casing. These repair plugs are normally of a vulcanizable material, or some material that is bondable to the material of the tire. They are normally inserted with a probe of some sort that jams the plug into the tire. After the plug has set in position long enough to activate the vulcanizing, or to set the bonding compound, the tire is normally ready for use. If desired, the projecting material of the plug may be trimmed off. Alternatively, it can be left to wear off against the road surface. The portion of the plug on the inside of the tire remains as a discontinuity of the casing. In large and heavy truck tires, where these plugs are normally used most frequently, the degree of imbalance produced by the presence of the inwardly-projecting portion of the plug is not significant enough to be objectionable.

The present invention provides a repair plug that can be cut from flat sheet material, and will yet solidly fill a hole in a tire casing. These plugs are inserted with a straight thrust with a probe in the same manner as most other repair plugs, and the configuration of the plug is such that the flat sheet material has a most unusual behavior as it is inserted. The various portions constituting the plug wrap themselves about in such a manner as to solidly fill the hole in a most surprising manner. When the plug has been adequately bonded by action of the adhesive or vulcanizing process, it will be found that the plug has become an integral part of the tire casing. The particular configuration of the repair plug defined by this invention is the result of extensive experiments, and applicants are quite unaware as to exactly why this particular configuration produces its characteristic behavior. It is enough to say that all other attempts at making repair plugs out of flat stock have not produced an adequate folding interengagement of the components of the plug in the manner characteristic of this invention.

The several features of the invention will be analyzed in detail through a discussion of the particular embodiments illustrated in the accompanying drawings. In the drawings:

FIGURE 1 shows a plan view of a tire in which a plug embodying this invention has been installed.

FIGURE 2 is a section through the plug shown in FIGURE 1, immediately after it is inserted.

FIGURE 3 is a view of the inside of the tire, showing the inwardly-projecting portion of the repair plug.

FIGURE 4 is an illustration of the insert probe used for installing the plugs.

FIGURE 5 shows a section of the installed repair plug from a different position from that of FIGURE 2.

FIGURES 6, 7 and 8 show three different sizes of repair plugs embodying this invention, these being intended to accommodate holes of various sizes in tire casings.

The tire casing 10 shown in FIGURES 1, 2, 3, and 5 has been repaired by the insertion of the plug 11 in a hole caused by some accident on the highway. In FIGURE 1, the characteristic installed condition of the plug appears, which involves a folding of the portions of the plug over each other to fully occupy the hole. In FIGURE 1, the portions of the plug are shown somewhat separated to illustrate the inter-folding behavior, whereas an actual installation produces a sufficient degree of compression through the process of inserting the plug in the hole that no space will exist between the overlaid portions.

Referring to FIGURES 2 and 3, the installation of the plug 11 will produce the portion 12 on the inside of the casing 10, and the portion 13 on the outside. The insertion of the plug 11 is accomplished through the use of the tool shown in FIGURE 4. This tool is essentially a shaft 14 preferably provided with a handle 15, and terminating at the opposite end in a fork 16 which embraces the opposite sides of the plug 11. The plug is jammed into the opening in the tire casing in the position shown in FIGURE 4, which may be considered as an edgewise movement. After the plug has been inserted to approximately the depth shown in FIGURES 2 and 5, the tool 14 is withdrawn. The withdrawal simply results in the disengagement of the fork 16 from the plug, leaving the plug in its inserted position.

FIGURE 6 illustrates the details of the configuration of the repair plug. The essential characteristics of this configuration are best described in terms of a deviation from a substantially rectangular configuration circumscribing a piece of flat sheet of which the patch is formed. This circumscribed rectangular configuration includes the sides 17 and 18 (each of which have dotted-line continuations along the central area) and the ends 19 and 20. This generally rectangular configuration is modified by substantially V-shaped cut-outs 21 and 22 in the central area, with the narrowest portion of the repair plug being that between the rounded apices 23 and 24. A line 25 joins the centers of curvature 26 and 27 of these apices, and it should be noted that the line 25 is inclined with respect to the sides 17 and 18. The cutouts 21 and 22 merge with the rectangular sides of the configuration at the rounded shoulders 28–31, and it should also be noted that the lines 32 and 33 joining the centers of curvature 34–35 and 36–37 are also inclined with respect to the sides 17 and 18, and with an opposite slant to that of the line 25. It is also preferable that the length of the radii of curvature extending from the centers 34 and 35 be less than that extending from the centers 36 and 37. The opposite ends of the repair plug are slit through as shown at 38 and 39 centrally, and parallel to the sides 17 and 18 of the rectangular configuration. It is preferable that the length of the slots (extending inwardly from the ends) be approximately 30% of the length of the rectangular configuration. FIGURES 7 and 8 show the application of these principles to repair plugs of a larger (FIGURE 7) and a smaller (FIGURE 8) version for use in repairing casing holes of different sizes.

Each of these patterns is constructed of a sheet of flexible material approximately .170 of an inch in thickness. This material is preferably laminated from a plurality of sheets of synthetic or natural rubber, the outer laminae of which have at least the exposed surfaces in an uncured form. The installation of the repair plug in the casing is preceded by an application of a chemical activator which induces a vulcanization of this exposed surface, and at the same time a bonding to the surrounding material of the casing at the hole occupied by the plug. The repair plugs will normally be marketed with a protective removable sheet adhered to the exposed surfaces, and this sheet is removed before the application of the plug. Alternatively, the adhesive may be applied directly to the hole being repaired.

The preferred conformation of the plugs defined by this invention are shown fairly close to scale in FIGURES 6, 7, and 8. A very interesting aspect of this invention is the fact that larger holes are repaired not by increasing the thickness of the plugs, but by increasing the width. It appears that the rounded corners of the rectangular configuration, shown at 40–43, are not critical, particularly as these portions of the patch are normally left projecting from the casing, as shown in FIGURES 2 and 5.

We claim:
1. A repair plug for a vehicle tire, comprising a sheet of material bondable to said tire, said sheet having a substantially rectangular configuration modified in the following respects:
   (a) substantially V-shaped opposite notches in the central portion, said notches having centers of curvature at the apices thereof disposed along a first line inclined with respect to the sides of said rectangular configuration,
   (b) the centers of curvature of the junctions of said notches with the sides of said rectangular configuration on each side of said line are disposed on second and third lines, respectively, said second and third lines being oppositely inclined to said sides from said first line,
said sheet having central slits parallel to said sides at the opposite ends of said sheet.

2. A repair plug as defined in claim 1, wherein the radii of curvature of said junctions at one side of said first line are greater than the radii of curvature of said junctions on the opposite side of said line.

3. A repair plug as defined in claim 1, wherein said slits extend inward from the end approximately thirty percent of the length of said plug.

References Cited

UNITED STATES PATENTS 3,282,320 11/1966 Klouza _____ 152—370
3,335,779 8/1967 Gruber _____ 152—370

ARTHUR L. LA POINT, *Primary Examiner.*

C. B. LYON, *Assistant Examiner.*